(12) United States Patent
Xie et al.

(10) Patent No.: US 11,759,836 B2
(45) Date of Patent: Sep. 19, 2023

(54) ELECTROKINETIC-AERATION-LIQUID INJECTION COMBINED REMEDIATION METHOD FOR COMPOUND CONTAMINATED SOIL CONTAINING HEAVY METALS AND ORGANIC SUBSTANCES

(71) Applicant: ZHEJIANG UNIVERSITY, Hangzhou (CN)

(72) Inventors: Xinyu Xie, Hangzhou (CN); Shangqi Ge, Hangzhou (CN); Lingwei Zheng, Hangzhou (CN); Xunli Zhang, Hangzhou (CN); Huai Nie, Hangzhou (CN); Chunyang Liu, Hangzhou (CN); Minyang Sun, Hangzhou (CN); Puxiu Dai, Hangzhou (CN); Kang Zhang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 55 days.

(21) Appl. No.: 17/553,672

(22) Filed: Dec. 16, 2021

(65) Prior Publication Data

US 2022/0176428 A1 Jun. 9, 2022

Related U.S. Application Data

(63) Continuation of application No. PCT/CN2021/097041, filed on May 29, 2021.

(30) Foreign Application Priority Data

Dec. 3, 2020 (CN) .......................... 202011408398.4

(51) Int. Cl.
*B09C 1/08* (2006.01)
*B09C 1/02* (2006.01)
*B09C 1/00* (2006.01)

(52) U.S. Cl.
CPC .............. *B09C 1/085* (2013.01); *B09C 1/005* (2013.01); *B09C 1/02* (2013.01); *B09C 2101/00* (2013.01)

(58) Field of Classification Search
CPC ........... B09C 1/085; B09C 1/005; B09C 1/02; B09C 2101/00
See application file for complete search history.

(56) References Cited

U.S. PATENT DOCUMENTS 5,435,895 A * 7/1995 Lindgren ................ B09C 1/085
  204/516
6,736,568 B1 * 5/2004 Pugh ......................... E02D 3/11
  405/129.75

(Continued)

FOREIGN PATENT DOCUMENTS

CN 102513348 A 6/2012
CN 102583712 A 7/2012

(Continued)

OTHER PUBLICATIONS

International Search Report (PCT/CN2021/097041); dated Jul. 27, 2021.
CN First Office Action(202011408398.4); dated Sep. 18, 2021.

*Primary Examiner* — Carib A Oquendo
(74) *Attorney, Agent, or Firm* — W&G Law Group

(57) ABSTRACT

Disclosed is an electrokinetic-aeration-liquid injection combined remediation method for compound contaminated soil containing heavy metals and organic substances, and belongs to the field of contaminated soil remediation. According to the present application, in the combined remediation method, the electrokinetic remediation method enables water in soil to migrate from bottom to top to drive heavy metals and organic substances to be enriched towards the top; bubbles generated by the aeration method are diffused from the bottom to the top to drive volatile organic (Continued)

compounds to move towards the top soil. During liquid injection process, the electrolyte is driven to move from bottom to top under the action of electrokinetic remediation flow, which can keep the pH of the soil stable and remediate heavy metals and organic pollutants. The whole processes are simultaneously completed by adopting the dual-channel porous EKG electrode designed by the present application, which is efficient and convenient.

3 Claims, 1 Drawing Sheet

(56) References Cited

U.S. PATENT DOCUMENTS

| | | | | |
|---|---|---|---|---|
| 10,835,938 B1* | 11/2020 | Lu | ............................ | B09C 1/02 |
| 2005/0126074 A1* | 6/2005 | Jones | .................... | A01G 24/42 |
| | | | | 204/600 |
| 2008/0132746 A1* | 6/2008 | Frisky | .................... | B09C 1/002 |
| | | | | 588/900 |
| 2016/0052030 A1 | 2/2016 | Athmer et al. | | |
| 2016/0311003 A1* | 10/2016 | Durkheim | ............. | C02F 11/006 |
| 2022/0088652 A1* | 3/2022 | Athmer | .................... | B09C 1/085 |

FOREIGN PATENT DOCUMENTS

| | | |
|---|---|---|
| CN | 103316909 A | 9/2013 |
| CN | 105312314 A | 2/2016 |
| CN | 205362215 U | 7/2016 |
| CN | 205659980 U | 10/2016 |
| CN | 206153285 U | 5/2017 |
| CN | 106881339 A | 6/2017 |
| CN | 107363092 A | 11/2017 |
| CN | 108213070 A | 6/2018 |
| CN | 108480385 A | 9/2018 |
| CN | 110695079 A | 1/2020 |
| CN | 111360060 A | 7/2020 |
| CN | 112642854 A | 4/2021 |
| EP | 1149206 A1 | 10/2001 |
| WO | 2011109342 A1 | 9/2011 |

* cited by examiner

ELECTROKINETIC-AERATION-LIQUID INJECTION COMBINED REMEDIATION METHOD FOR COMPOUND CONTAMINATED SOIL CONTAINING HEAVY METALS AND ORGANIC SUBSTANCES

CROSS-REFERENCE TO RELATED APPLICATIONS

The present application is a continuation of International Application No. PCT/CN2021/097041, filed on May 29, 2021, which claims priority to Chinese Application No. 202011408398.4, filed on Dec. 3, 2020, the contents of both of which are incorporated herein by reference in their entireties.

TECHNICAL FIELD

The present application belongs to the field of contaminated soil remediation, and particularly relates to an electrokinetic-aeration-liquid injection combined remediation method for compound contaminated soil containing heavy metals and organic substances.

BACKGROUND

With the acceleration of industrialization, soil pollution caused by industrial production, agricultural production and urban life has gradually increased, and the types of contaminated sites have gradually developed from single pollution source to multiple pollution sources. More and more soils are contaminated by compound contaminants of heavy metals and organic substances, which seriously endangers the health of human beings, animals and plants, and has become one of the environmental problems to be solved urgently.

Common remediation methods of contaminated soil, such as electrokinetic remediation, aeration, solidification/stabilization, etc., generally only have a good remediation effect on a single type of contaminated soil. At present, there is still a lack of a soil remediation method, which can give good consideration to the remediation of both heavy metal contaminated soil and organic contaminated soil. For example, the aeration method has a good effect on remediation of volatile organic compounds in groundwater; the removal effect of heavy metal ions in soil by electrokinetic remediation is better; the treatment of contaminated soil by the solidification/stabilization method can realize the sealing effect of pollutants, but the treatment depth is often limited; thermal desorption is more suitable for treating organic contaminated soil. In the case of remediation of compound contaminated soil, it is often necessary to combine various remediation methods to achieve good remediation results of compound contaminated soil with heavy metals and organic substances.

SUMMARY

In order to solve the problem that a single remediation method cannot remediate the compound contaminated soil containing both heavy metals and organic substances in the above electrokinetic remediation process, the present application provides an electrokinetic-aeration-liquid injection combined remediation method for compound contaminated soil containing heavy metals and organic substances.

The purpose of the present application is realized by the following technical solution: an electrokinetic-aeration-liquid injection combined remediation method for compound contaminated soil containing heavy metals and organic substances, comprising the following steps:

(1) laying a double-channel porous EKG electrode at the bottom of compound contaminated soil, wherein the electrode is provided with a liquid injection transmission channel and a bubble transmission channel inside, and an upper surface of the electrode is provided with a plurality of liquid injection holes connected to the liquid injection transmission channel and a plurality of bubble emission holes connected to the bubble transmission channel; a conventional EKG electrode and an isolation layer are laid in turn at the top of the contaminated soil, and a pumping well is buried;

(2) connecting the dual-channel porous EKG electrode at the bottom to an anode of a power supply, connecting the EKG electrode at the top to a cathode of the power supply, powering on to start electrokinetic remediation;

(3) injecting micro-nano bubbles through the bubble emission holes in the dual-channel porous EKG electrode at the bottom, starting an aeration process, opening the pumping well at the top, and collecting toxic gases; injecting an electrolyte through the liquid injection holes in the double-channel porous EKG electrode at the bottom to start a liquid injection process (4) after finishing the processes of electrokinetic remediation and aeration-liquid injection, in-situ or ectopic treatment is carried out on the surface soil enriched with pollutants by leaching or solidification/stabilization.

Furthermore, the electrolyte injected by the injection holes in double-channel porous EKG electrode at the bottom is natural surfactant, glycerin, sodium bicarbonate or a mixed solution, etc., and is used for remediating heavy metals and organic pollutants in the contaminated soil.

Furthermore, the bubbles injected by the bubble emission holes through the dual-channel porous EKG electrode at the bottom are micro-nano bubbles, which are small in size, slow in movement and in a curvilinear rising state, with a high gas-liquid mass transfer rate and a better remediation effect.

Furthermore, the whole remediation process is carried out from bottom to top, so that heavy metals and organic pollutants are enriched in top soil; finally, only step (4) is needed to treat the surface contaminated soil.

Furthermore, the dual-channel porous EKG electrode can be used as an electrode material for electrokinetic remediation, can be used for air bubble transmission by the aeration method, and can also be used for injecting the electrolyte into the contaminated soil.

Furthermore, by using the electrokinetic remediation method, water in the soil moves from the bottom to the top, which drives the pollutants to be enriched to the top and contributes to a better treatment effect on heavy metals; at the same time, the electroosmotic flow can generate more diffusion channels and driving forces for bubbles.

Furthermore, the aeration method is used to generate bubbles, and a large number of hydroxyl radicals are generated when the bubbles burst; redox potentials of the bubbles can oxidize and reduce the pollutants that are difficult to remove in the contaminated soil, which has a better treatment effect on organic pollutants and can enhance the remediation effect of the electrokinetic remediation method.

Furthermore, in the process of electrokinetic remediation, a slightly acidic environment is produced near the anode, and the electrolyte can alleviate the strong acidity near the anode and keep the pH of the soil stable; higher temperature near the anode causes the electrolyte decomposing into gases, which can promote the bubbles generated by the aeration method to further expand in the process of moving from the bottom to the top, further increase a contact force with the soil and take away more pollutants.

Furthermore, toxic gases collected in the pumping well at the top are purified by a gas purification device; discharged liquid that is collected at the cathode is subjected to purification treatment.

Furthermore, the isolation layer adopts an impermeable geomembrane for preventing the gases carrying toxic substances generated by the aeration method and the liquid carrying toxic substances generated during remediation from being discharged into the external environment.

The present application has the following advantages and effects.

1. The present application make full use of the advantages of the electrokinetic remediation method and aeration method, the electrokinetic remediation method drives heavy metals in contaminated soil to be enriched to the top soil; micro-nano bubbles generated by aeration drive volatile organic compounds to diffuse to the top soil; the electrokinetic remediation flow generates more diffusion channels and diffusion driving force for aeration, and the aeration process accelerates the desorption of pollutants on the surface of soil particles and dissolves them into pore water.

2. As for the intermittent liquid injection method in the process of electrokinetic remediation, by intermittently injecting an electrolyte containing natural surfactant, glycerin, sodium bicarbonate, etc., the liquid is driven to move from bottom to top under the action of the electrokinetic remediation flow;

3. Carbon dioxide is produced by decomposition of sodium bicarbonate and other components from electrolyte due to the relatively acidic environment and high temperature generated at the bottom of soil (near the anode) during electrokinetic remediation process, in the meanwhile, the electrokinetic remediation method can make micro-nano bubbles generated by the aeration method continue to expand in the process of moving from the bottom to the top, increase the contact force with the soil and take away more pollutants; sodium bicarbonate can also avoid strong acidity near the anode and maintain the pH stability of the soil during electroosmosis.

4. The natural surfactant used in liquid injection is more conducive to the separation of heavy metals and organic pollutants from soil particles, and strengthens the remediation effects of electrokinetic remediation and aeration.

5. The electrokinetic remediation method, aeration method and liquid injection process are simultaneously completed by adopting the dual-channel porous EKG electrode designed by the present application, which is efficient and convenient.

Reference signs: 1—host material; 2—conductive material; 3—liquid injection hole; 4—bubble emission hole; 5—liquid injection transmission channel; 6—bubble transmission channel; 7—micro—nano bubble generator; 8—liquid supply chamber; 9—pumping well; 10—gas purification device; 11—conventional EKG electrode; 12—conveying pipeline; 13—double-channel porous EKG electrode; 14—electrokinetic remediation flow direction; 15—micro-nano bubble diffusion; 16—liquid diffusion; 17—bubble movement direction; 18—isolation layer; 19—contaminated soil.

DESCRIPTION OF EMBODIMENTS

The present application will be further explained with specific embodiments below, but the present application is not limited by the embodiments.

Figure 1:
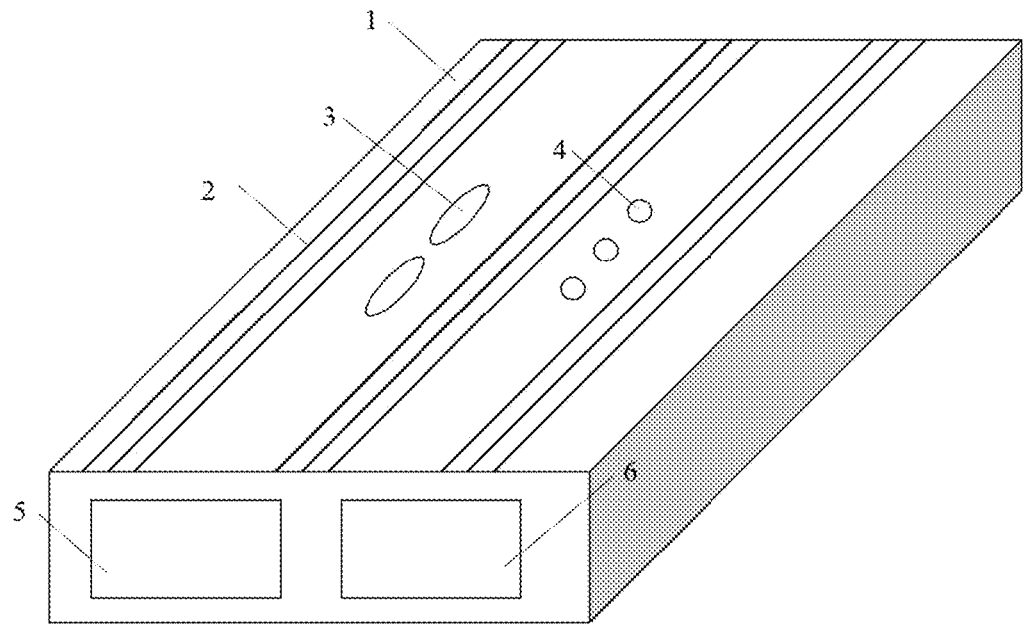
FIG. 1 is a schematic structural diagram of a dual-channel porous EKG electrode provided by an embodiment of the present application.

In an embodiment of the present application, firstly a dual-channel porous EKG electrode 13 is prepared, as shown in FIG. 1, the electrode 13 is provided with a liquid injection transmission channel 5 and a bubble transmission channel 6 inside, and the upper surface of the electrode 13 is provided with a plurality of liquid injection holes 3 connected to the liquid injection transmission channel 5 and a plurality of bubble emission holes 4 connected to the bubble transmission channel 6. The dual-channel porous EKG electrode 13 can be used as an electrode material for electrokinetic remediation, can transport bubbles for the aeration method, and also has a liquid injection channel.

Both the dual-channel porous EKG electrode 13 and the conventional EKG electrode 11 have a host material 1 and a conductive material 2, wherein the host material 1 is made of polyethylene or polyvinyl chloride, and the conductive material 2 is made of carbon fiber or stainless steel.

In this embodiment, after the dual-channel porous EKG electrode 13 is prepared, the heavy metal-organic compound contaminated soil is remediated by electrokinetic-aeration-liquid injection, and the remediation method includes the following steps:

(1) A double-channel porous EKG electrode 13 is laid on the bottom of the compound contaminated soil containing heavy metals and organic substances 19, a conventional EKG electrode 11 and an isolation layer 18 are laid on the top in turn, and a pumping well 9 is buried; in addition, a micro-nano bubble generator 7 and a liquid supply chamber 8 are arranged, the isolation layer 18 adopts an impermeable geomembrane, which is used to prevent the gas carrying toxic substances generated by the aeration method and the liquid carrying toxic substances generated during remediation from being discharged into the external environment; the micro-nano bubbles and liquid generated by the micro-nano bubble generator 7 and the liquid supply chamber 8, respectively, are transmitted to the dual-channel porous EKG electrode 13 at the bottom of the contaminated soil 19 through the transmission pipeline 12.

(2) The dual-channel porous EKG electrode 13 at the bottom is connected to the anode of a power supply, and the EKG electrode 11 at the top is connected to the cathode of the power supply; the electrokinetic remediation is started after being powering on.

(3) The micro-nano bubble generator 7 produces micro-nano bubbles, the double-channel porous EKG electrode 13 at the bottom injects bubbles through the bubble emission holes 4, and the aeration process is started; the pumping well 9 at the top is opened to collect toxic gases, which are then purified by the gas purification device 10; the liquid supply chamber 8 intermittently supplies an electrolyte, and the double-channel porous EKG electrode 13 at the bottom injects the electrolyte through the liquid injection holes 3 to start the liquid injection process; the discharged liquid is collected at the cathode and then the discharged liquid is subjected to purification;

wherein, the electrolyte can be natural surfactant, glycerin, sodium bicarbonate or a mixed solution, etc., to remediate heavy metals and organic pollutants in contaminated soil; micro-nano bubbles injected through the bubble emission holes are small in size, slow in movement, in a curve rising state, high in gas-liquid mass transfer rate and better in remediation effect.

(4) After the process of electrokinetic remediation and aeration injection, in-situ or ectopic treatment is carried out on the surface soil enriched with pollutants by leaching or solidification/stabilization.

Figure 2:
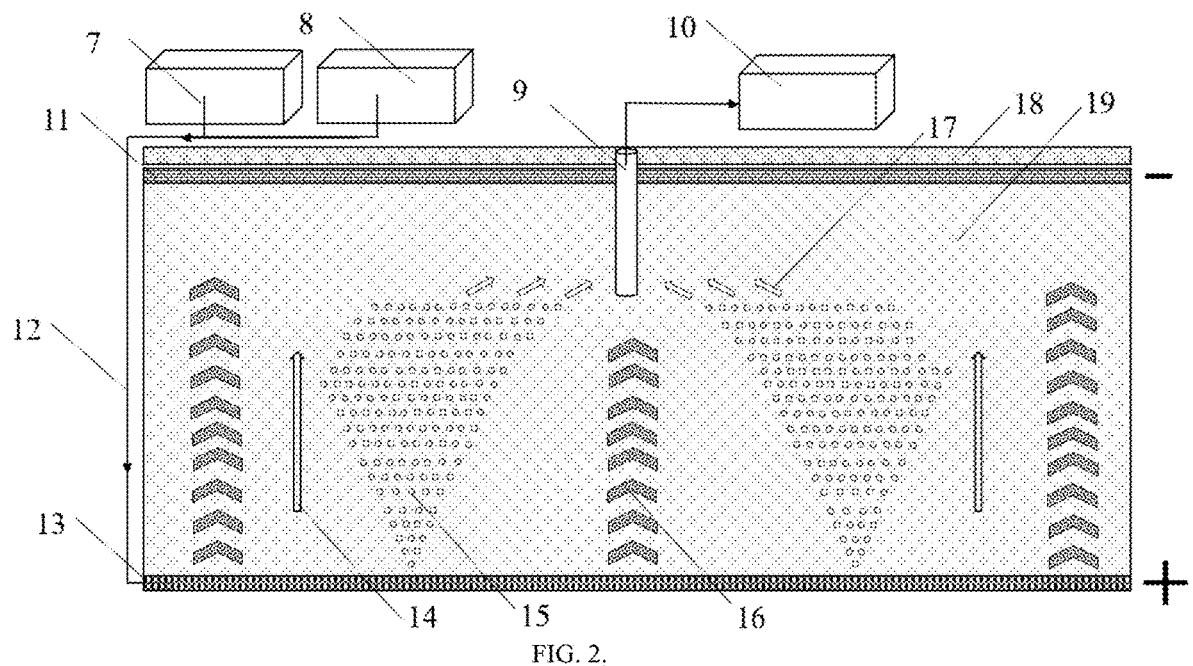
FIG. 2 is a schematic diagram of a an electrokinetic-aeration-liquid injection combined remediation method for organic substances provided by an embodiment of the present application.

In the process of remediation of the contaminated soil, the electrokinetic remediation flow direction 14, micro-nano bubble diffusion 15, liquid diffusion 16 and bubble movement direction 17 are shown in FIG. 2.

Through the above steps, the water and injected liquid in the contaminated soil 19 move from the bottom to the top under the action of the electrokinetic remediation flow after being powering on, and the heavy metals and organic pollutants in the contaminated soil 19 are desorbed into the pore water, and are enriched to the top soil along with the electrokinetic remediation flow; at the same time, micro-nano bubbles continuously diffuse upwards, dissolving volatile organic compounds, and finally are collected by the pumping well 9. A large number of hydroxyl radicals are generated by the breaking of micro-nano bubbles, and their redox potentials can oxidize the organic and heavy metal pollutants which are difficult to be desorbed in the contaminated soil 19, which is not only beneficial to the removal of organic matters by aeration, but also beneficial to enhancing the remediation effect of the electrokinetic remediation method.

The above embodiments are only exemplary embodiments of the present application, and are not intended to limit the scope of the present application. Equivalent changes and modifications made by any person skilled in the art without departing from the concepts and principles of the present application shall fall into the scope of protection of the present application.

What is claimed is:

1. An electrokinetic-aeration-liquid injection combined remediation method for compound contaminated soil containing heavy metals and organic substances, comprising the following steps:
   (1) laying a double-channel porous electro kinetic geosynthetics (EKG electrode at a bottom of compound contaminated soil, wherein the double-channel porous EKG electrode is provided with a liquid injection transmission channel and a bubble transmission channel inside, and an upper surface of the electrode is provided with a plurality of liquid injection holes connected to the liquid injection transmission channel and a plurality of bubble emission holes connected to the bubble transmission channel; a conventional EKG electrode and an isolation layer are laid in turn at a top of the contaminated soil, and a pumping well is buried;
   (2) connecting the dual-channel porous EKG electrode at the bottom to an anode of a power supply, connecting the conventional EKG electrode at the top to a cathode of the power supply, powering on to start electrokinetic remediation;
   (3) injecting micro-nano bubbles through the bubble emission holes in the dual-channel porous EKG electrode at the bottom, starting an aeration process, opening the pumping well at the top, and collecting toxic gases;
   an electrolyte is injected through the liquid injection holes in the double-channel porous EKG electrode at the bottom to start a liquid injection process;
   discharged liquid is collected at the cathode; the electrolyte is natural surfactant, glycerin, sodium bicarbonate or a mixed solution, and is used for remediating heavy metals and organic pollutants in the contaminated soil;
   the whole remediation process is carried out from bottom to top, so that heavy metals and organic pollutants are enriched in top soil.
   (4) carrying out in-situ or ectopic treatment on a surface soil enriched with pollutants by leaching or solidification/stabilization after finishing the processes of electrokinetic remediation and aeration-liquid injection;
   wherein by using the electrokinetic remediation method, water in the soil moves from the bottom to the top, which drives the pollutants to be enriched to the top, which has a better treatment effect on heavy metals; at the same time, an electroosmotic flow is configured to generate more diffusion channels and driving forces for bubbles;
   the aeration method is used to generate bubbles, and a large number of hydroxyl radicals are generated when the bubbles burst; redox potentials of the bubbles is capable of oxidizing and reducing the pollutants that are difficult to remove in the contaminated soil, which has a better treatment effect on organic pollutants and is capable of enhancing the remediation effect of the electrokinetic remediation method;
   in the process of electrokinetic remediation, a slightly acidic environment is produced near the anode, and the electrolyte is capable of alleviating the strong acidity near the anode and keep the pH of the soil stable; higher temperature near the anode causes the electrolyte decomposing into gases, and the generated gases near anode promotes the bubbles generated by the aeration method to further expand in the process of moving from the bottom to the top, so as to increase a contact force with the soil and take away more pollutants;
   the isolation layer adopts an impermeable geomembrane for preventing the gases carrying toxic substances generated by the aeration method and the liquid carrying toxic substances generated during remediation from being discharged into the external environment.

2. The method according to claim 1, wherein the dual-channel porous EKG electrode is configured as an electrode material for electrokinetic remediation, configured to transmit air bubble in the aeration method, and further configured to inject the electrolyte into the contaminated soil.

3. The method according to claim 1, wherein toxic gases collected in the pumping well at the top are purified by a gas purification device; discharged liquid that is collected at the cathode is subjected to purification treatment.

* * * * *